(12) United States Patent
Hedlund et al.

(10) Patent No.: US 8,002,333 B2
(45) Date of Patent: *Aug. 23, 2011

(54) STRUCTURAL ELEMENT

(75) Inventors: Anders Hedlund, Göteborg (SE); Claes Fredö, Lerum (SE)

(73) Assignee: Volvo Lastvagnar AB, Göteborg (SE)

( * ) Notice: Subject to any disclaimer, the term of this patent is extended or adjusted under 35 U.S.C. 154(b) by 469 days.

This patent is subject to a terminal disclaimer.

(21) Appl. No.: 11/719,095

(22) PCT Filed: Nov. 11, 2005

(86) PCT No.: PCT/SE2005/001712
§ 371 (c)(1),
(2), (4) Date: Mar. 17, 2009

(87) PCT Pub. No.: WO2006/052210
PCT Pub. Date: May 18, 2006

(65) Prior Publication Data
US 2009/0212599 A1    Aug. 27, 2009

(30) Foreign Application Priority Data
Nov. 11, 2004   (SE) .................................... 0402781

(51) Int. Cl.
*B60R 99/00*   (2009.01)

(52) U.S. Cl. ............. 296/191; 296/193.07; 296/203.01; 296/204; 700/103; 700/97

(58) Field of Classification Search ................. 296/191, 296/193.07, 203.01, 204; 700/103, 97
See application file for complete search history.

(56) References Cited

U.S. PATENT DOCUMENTS 6,641,489 B1 * 11/2003 Wright et al. ................. 473/318
6,779,404 B1 *  8/2004 Brincker et al. ............... 73/659

FOREIGN PATENT DOCUMENTS

| EP | 1281604 A2 | 2/2003 |
| JP | 5221342 A | 8/1993 |
| JP | 9202269 A | 8/1997 |

OTHER PUBLICATIONS

International Search Report for corresponding International Application PCT/SE2005/001712.

* cited by examiner

*Primary Examiner* — Lori Lyjak
(74) *Attorney, Agent, or Firm* — WRB IP LLP (57) ABSTRACT

Structural element, such as a panel, which is embossed with a mode shape ($\phi_{total}$), i.e. with any of the various stationary vibration modes ($\phi_n$) of which the structural element is capable, or a combination thereof.

23 Claims, 6 Drawing Sheets

STRUCTURAL ELEMENT

BACKGROUND AND SUMMARY

The present invention concerns a structural element, such as a panel, i.e. a piece of construction material made to form part of a surface whereby the width and height of the panel is large compared to its thickness. The structural element is intended for use in a vehicle, washing machine, fan or any other device that is subjected to transient and/or cyclic and/or random loading. The present invention also concerns a method for designing a structural element.

Mechanical systems under cyclic loading, such as vehicles, fans or washing-machines, normally present structural vibrations. These vibrations can cause noise and fatigue problems, they can annoy and disturb people in the vicinity of said systems and they can constitute a safety risk. The vibration amplitudes can be partially reduced by using rigid or reinforced structures, by applying springs or other kinds of damping means or by using damping material to absorb the mechanical energy related to vibrations. However, these solutions can not be always used because they can change the system design, weight or cost.

U.S. Pat. No. 6,793,276 discloses a vehicle floor that is partitioned into a plurality of substantially rectangular panels. These panels are arranged such that vibration of a 2×1 mode, in which two antinodes are generated in the length direction of the vehicle and one antinode is generated in the width direction of the vehicle, occurs in the floor panels when vibrations of a predetermined frequency, 240 to 260 Hz, are input to the floor panels from the outside of the vehicle. This means that two adjacent sections of each floor panel are made to vibrate with opposite phase but with the same amplitude so that the radiated sounds from each section cancel each other out and there is a considerable drop in the acoustic radiation efficiency and consequently road noise between 240 and 260 Hz can be reduced. Reinforcing members constituting the vehicle frame isolate each floor panel so that coupled vibration between said floor panels and other floor panels and surrounding structures is prevented and so that the intended 2×1 vibration mode can be excited in each floor panel.

A disadvantage with such a system is that if vibration coupling is not suppressed the sound that is radiated from the floor panels becomes insufficiently cancelled. Furthermore the vibration region of the floor panels must be substantially rectangular in order to generate vibrations in a 2×1 mode, which limits a vehicle manufacturer's design options.

It is desirable to provide a structural element, such as a panel or beam or a more complex structure, which will cause fewer vibration problems compared to known structural elements.

A structural element according to an aspect of the present invention that is embossed with a mode shape, i.e., with any of the various stationary vibration modes of which the structural element is capable or a combination thereof, i.e., a superposition of a plurality of vibration modes, since it has been found that the optimum topography of a structural element that is subjected to cyclic loading is said mode shape.

According to an embodiment of the invention the, or each, vibration mode is amplified by a factor greater than zero or less than zero but not equal to zero before being embossed onto the structural element by press-shaping or casting for example i.e., the factor C can take any value except zero. As long as the structural element's topography corresponds to a mode shape the amplitude of the peaks and troughs of the mode shape may be the same as, or smaller than, or greater than the amplitude of the peaks and troughs of the vibration mode. If C is less than zero the embossing direction will be opposite to the embossing direction when C is greater than zero.

Said amplification factor is the factor by which the maximum depth of a peak or trough of the vibration mode of the structural element is increased or decreased. For example if the maximum depth of a peak or trough of a vibration mode of the structural element is 0.1 mm and the vibration mode is amplified by a factor of 200, then the maximum depth of the mode shape that is embossed on the structural element will be 20 mm. It should be noted that the expression "depth" is intended to mean the distance by which a point on the surface of a non-embossed structural element is displaced, upwards or downwards, to produce an embossed structural element.

A significant performance improvement is achieved in comparison with conventional structural elements that utilize damping material, reinforcement ribs and beams or embossing patterns selected on other criteria by using the inventive structural element. The inventive embossed structural element will not only reduce noise radiated from it due to vibration but will also exhibit increased strength and rigidity due to its contoured or corrugated topography. Furthermore since no reinforcement structures or other material is added to the structural element it can be manufactured at reduced cost and weight compared to conventional structural elements. Further advantages are reduced annoyance, reduced human fatigue and drowsiness, improved safety and reliability.

According to an embodiment of the invention a stationary vibration mode is a normal mode, i.e., a free vibration mode, or an operational deflection shape (ODS), i.e., a forced vibration mode. Normal modes, which also are called natural modes or eigenvectors, are associated with a natural frequency (resonant frequency) of the structural element. Operational deflection shapes are the sum of a plurality of modes where the resultant vibration mode depends on the forcing frequency and the distribution of excitation. The operating deflection shape is stationary or changes over time and can be understood as a sum of modal data (such as for example natural frequency, mode shape, damping) plus forcing data.

Every structural element has its own, often unique, vibration modes that depend primarily on the geometry and how the structural element is mounted or supported and which can be calculated using a FEM (Finite Element Method) or which can be measured by means of sensors.

According to a further embodiment of the invention the mode shape of the structural element, ($\phi_{total}$ is defined by one of the following equations: where the individual modes of the non-embossed structural element are denoted by $\phi_n$ where n is the mode number; the embossing amplitude for mode n is $C_n$, and the absolute value of a mode is denoted by the symbol | |:

$$\phi_{total} = C\phi_n$$

$$\phi_{total} = C|\phi_n|$$

$$\phi_{total} = C_1\phi_1 + C_2\phi_2 + \ldots C_n\phi_n$$

$$\phi_{total} = C_1|\phi_1| + C_2|\phi_2| + \ldots C_n|\phi_n|$$

According to a further embodiment of the invention said mode shape is determined by using the absolute or actual values of one or more modes. If absolute values are used the convex parts of the embossed structural element will face the same direction. If actual values are used the convex parts of the mode shape will not face the same direction but will protrude from the structural element in both directions perpendicular to the surface of the structural element (unless the mode shape is the first 1:1 mode, which by definition only has one direction). In some applications absolute values may have to be used due to space limitations on one side of a structural element for example.

$\phi_{total}$ can alternatively be defined as the sum of absolute values and actual values in a combination.

The present invention also concerns a vehicle that comprises a structural element according to any of the embodiments of the invention. Said structural element may constitute at least part of the floor or body of the vehicle.

The present invention further concerns a method for designing a structural element, such as a panel or beam or a more complex structure. The method comprises the steps of determining one or more vibration modes of a structural element, such as a substantially flat or pre-shaped structural element and embossing said structural element with a mode shape i.e., any of the various stationary vibration modes ($\phi_n$) of which the structural element is capable, or a combination thereof, by press-shaping or casting for example.

According to an embodiment of the invention the method comprises the step of amplifying the, or each vibration mode by a factor greater than zero or less than zero but not equal to zero to obtain a mode shape that corresponds to a single amplified vibration mode or a superposition of amplified vibration modes before embossing a mode shape onto the structural element.

According to an embodiment of the invention the method comprises the step of determining a plurality of mode shapes for a structural element and determining the vibration/acoustic and/or physical properties of a structural element having each of said mode shapes. The mode shape having the desired properties for a particular application is then selected and the structural element is embossed with that mode shape. The optimal mode shape may therefore be determined by calculation before a structural element has been embossed.

According to another embodiment of the invention the method comprises the step of selecting the mode shape that has at least one vibration mode within a desired frequency band, for example within a frequency band at which energy orders of an engine are expected to excite for only short time intervals. Alternatively or simultaneously a mode shape that has at least a local rigidity within a desired range of rigidity is selected i.e., depending on the application, part of the structural element or the entire structural element may be arranged to have a particular rigidity. The frequency of the first vibration mode of an embossed structural element is a good measure of the increase in rigidity of the embossed structural element as compared to a non-embossed structural element and is also an indicator of the reduction in vibration that can be expected.

According to another embodiment of the invention the method comprises the step of determining the frequency at which there is a vibration related problem in the structural element and selecting a mode shape that reduces or eliminates the vibration problem at that frequency. According to a further embodiment of the method comprises the step of determining the frequency at which the most noise is radiated by the structural element and selecting a mode shape that reduces or eliminates noise transmission at that frequency. Noise transfer functions (NTFs) (i.e. Pa/N), acoustic transfer functions (Pa/m$^3$/s$^2$) or uncoupled acoustic transfer vectors that relate the vibration of a structural element to sound pressure may for example be computed in a noise transmission analysis to identify the noisiest vibration modes of the structural element.

According to another embodiment of the invention the method comprises the step of determining the mode shape of a structural element by iteratively increasing or decreasing the amplitude factor in finite steps and/or increasing or decreasing the embossing depth in finite steps. The vibration/acoustic and/or physical properties of a structural element having each of said mode shapes are then determined, the mode shape having the desired properties for a particular application is selected and the structural element is embossed with that mode shape. Iterations may continue until a maximum desired frequency or embossing depth has been obtained. Frequency (f) is directly proportional to the square root of a structural element's rigidity coefficient (k) divided by the mass (m) of the structural element;

$$f \propto \sqrt{\frac{k}{m}}$$

A large embossing depth results in a large increase of the local rigidity of the structural element and a large increase of the natural frequency whereas in contrast a small embossing depth results in a small increase of the local rigidity of the structural element and a small increase of the natural frequency. The rigidity and natural frequency of the structural element can therefore be selected to suit requirements by adjusting the embossing depth.

According to a further embodiment of the invention said vibration modes are calculated, by means of FEM for example, or measured by means of sensors. Once a vibration mode has been determined it can be superimposed on the structural element from which the mode shapes were determined, such as a flat or non-flat, pre-shaped panel. The natural frequency and the mode shape of the structural element are affected by the embossing pattern.

According to an embodiment of the invention said vibration modes are normal modes, i.e., free vibration modes, or operational deflection shapes, i.e., forced vibration modes.

According to another embodiment of the invention said mode shape is determined by using the absolute or actual values of one or more vibration modes.

According to an embodiment of the invention said vibration modes of the structural element are preferably determined on a structural element as mounted or supported in the particular application in which it will be utilized.

According to a further embodiment of the invention the method comprises the step of embossing the structural element with a plurality of amplified or non-amplified vibration modes one at a time, or at the same time i.e., by embossing the structural element with a mode shape that is a superposition of amplified or non-amplified vibration modes.

The present invention also concerns a computer program product that comprises a computer program containing computer program code means arranged to cause a computer or a processor to execute at least one of the steps of a method according to any of the embodiments of the invention, stored on a computer-readable medium or a carrier wave.

BRIEF DESCRIPTION OF THE DRAWINGS

The present invention will hereinafter be further explained by means of non-limiting examples with reference to the appended figures where.

DETAILED DESCRIPTION

Figure 1:
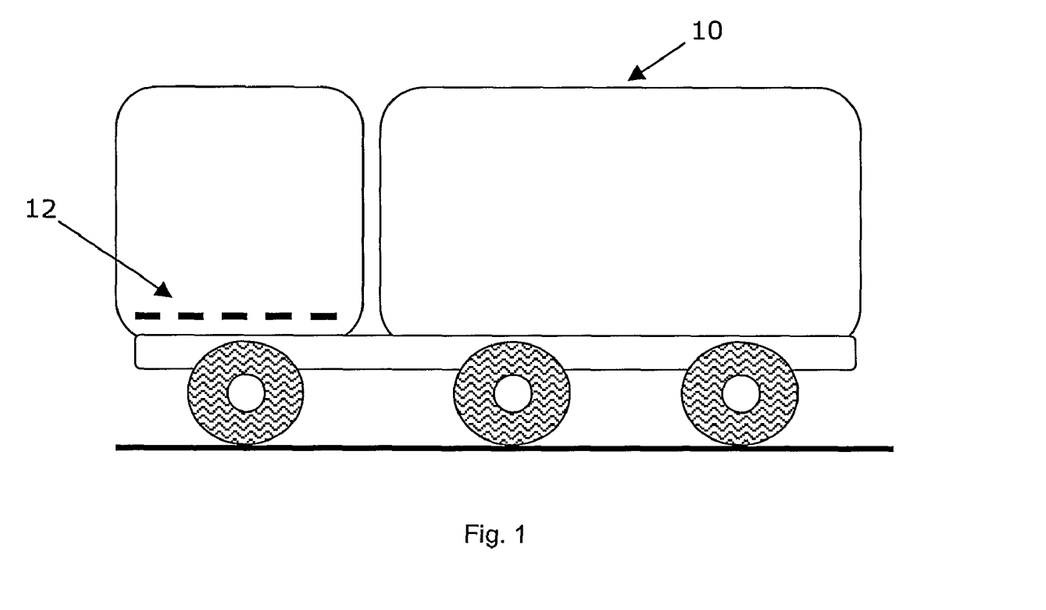
FIG. 1 shows a vehicle comprising a floor panel.

FIG. 1 shows a heavy goods vehicle 10 that comprises a substantially flat floor panel 12 whose position is indicated by a dashed line. The floor panel 12 is connected to the vehicle frame by spot welds for example. The panel 12 may comprise any material that provides a certain degree of rigidity, such as steel, aluminium, plastic or composite material.

Figure 2:
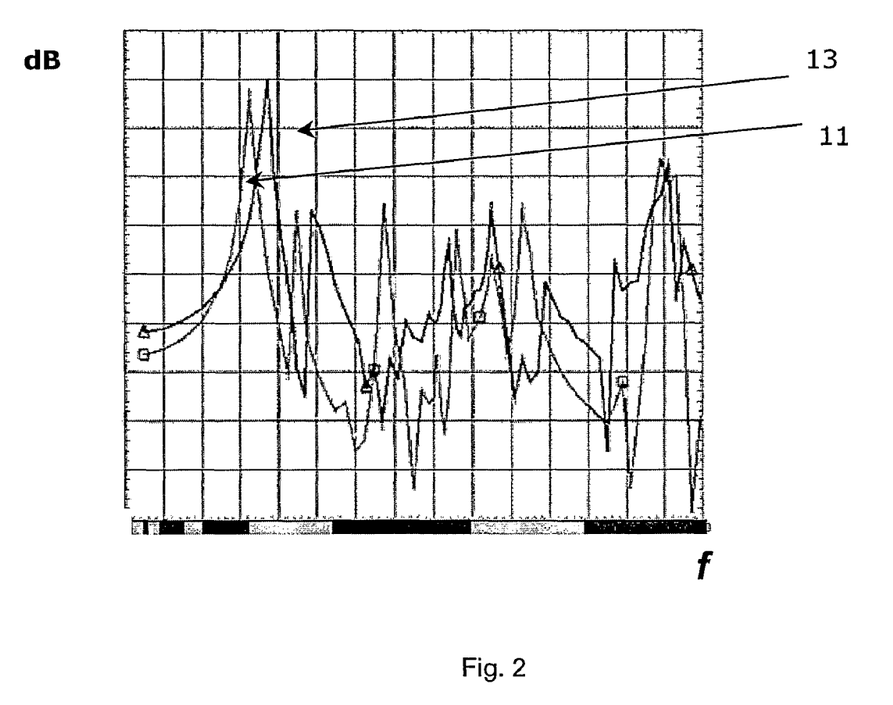
FIG. 2 shows the acoustic transmission from a known un-embossed panel and an embossed panel according to an embodiment of the invention.

FIG. 2 shows the acoustic transmission from a known, un-embossed panel 11 and an embossed panel 13 according to an embodiment of the invention. The acoustic transmission of the panel changes when it has been embossed. The frequency of the first vibration mode of the inventive embossed panel 13 is for example higher than frequency of the first vibration mode of the non-embossed panel 13 as can be seen from the position of the first two peaks on the left hand side of FIG. 2. The inventive panel 13 has namely been embossed with a mode shape that shifts the frequency of the first vibration mode to a frequency band that is not as disruptive for people in the vicinity of the panel.

Figure 3:
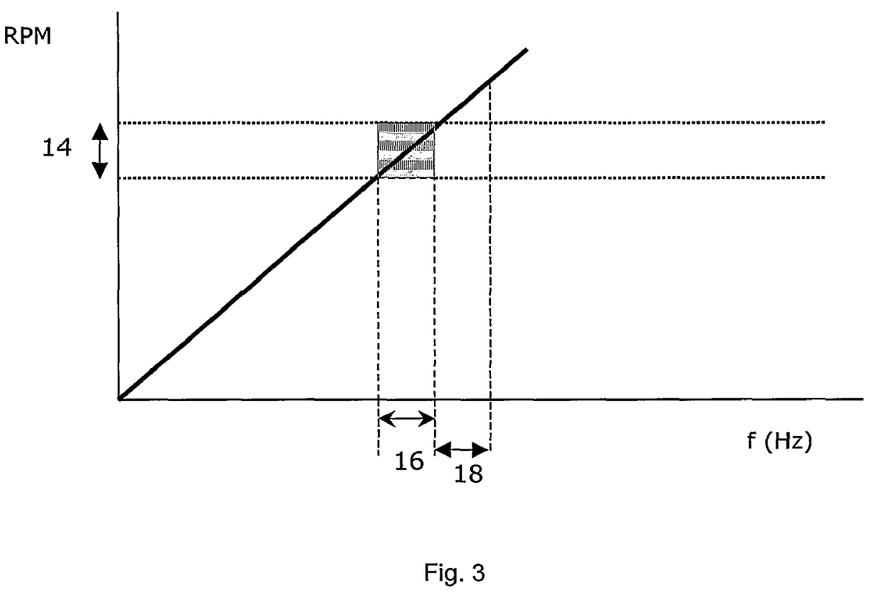
FIG. 3 is a graph of the rotational speed of an engine versus frequency.

FIG. 3 is a graph that may be used to identify the frequency, or frequencies, at which the most noise is transmitted by a floor panel 12 and thereafter to select the mode shape that reduces or eliminates noise transmission at that frequency or at those frequencies. The graph shows the vibration frequencies produced by an engine and transmitted to a floor panel 12 when the engine is operating at its most common RPM range 14 (1200 to 1800 RPM for example). The floor panel vibrates, causing the air within the passenger compartment to vibrate and thus generating unwanted vibrations and noise. A frequency band 16 defines the frequencies at which the most noise is transmitted into the vehicle to the driver of the vehicle, such as 25-30 Hz (which is the idle rotational speed of the 6-cylinder engine of a heavy goods vehicle) or 30-100 Hz (which corresponds to said vehicle's 3rd order).

By modifying the topography of the floor panel 12, its natural frequency is shifted upwards and so the floor panel no longer resonates when subjected to frequencies in frequency band 16. The target frequency band into which the natural frequency of the floor panel 12 is to be shifted is to frequency band 18 so that acoustic radiation from the floor panel caused by the engine is more acceptable. The target frequency band is of course different for different engines. Even though the embossed floor panel will radiate acoustic energy at this higher frequency, high frequency problems are easier to solve than low frequency problems.

Figure 4:
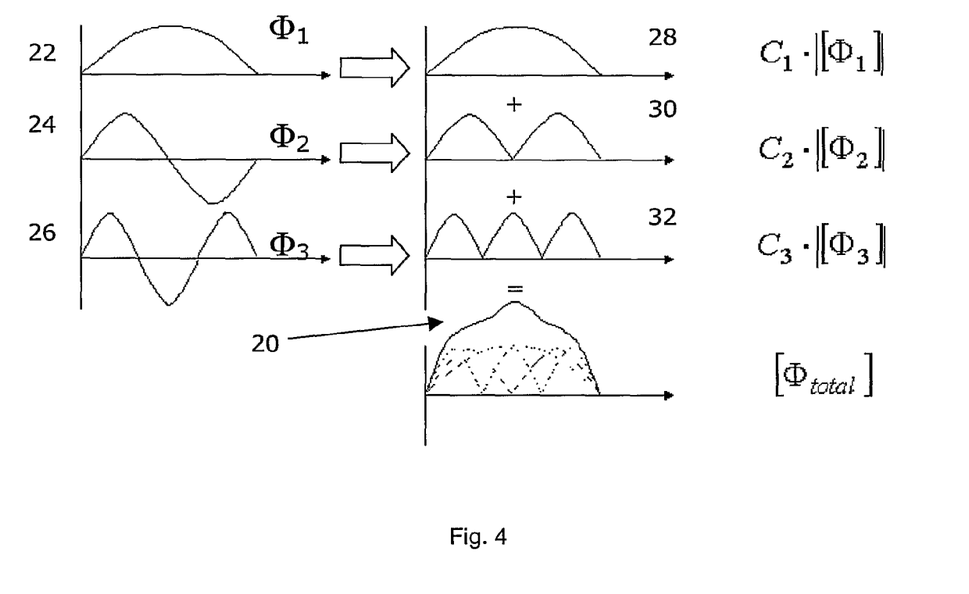
FIG. 4 illustrates how a mode shape may be determined according to an embodiment of the invention.

FIG. 4 shows how an optimal mode shape ($\phi_{total}$) 20 can be determined according to an embodiment of the invention. FIG. 4 shows three vibration modes ($\phi_1$, $\phi_2$ and $\phi_3$) of the substantially flat floor panel 12, namely 22, 24 and 26. The absolute values 28, 30 and 32 of these three modes are calculated and multiplied by factors C1 C2 and C3 respectively before being added to obtain the resultant mode shape 20. The resultant mode shape $\phi_{total}$ is then imprinted on the panel 12. Since absolute values have been used, the convex parts of the embossed panel will all protrude in the same direction.

Figure 5:
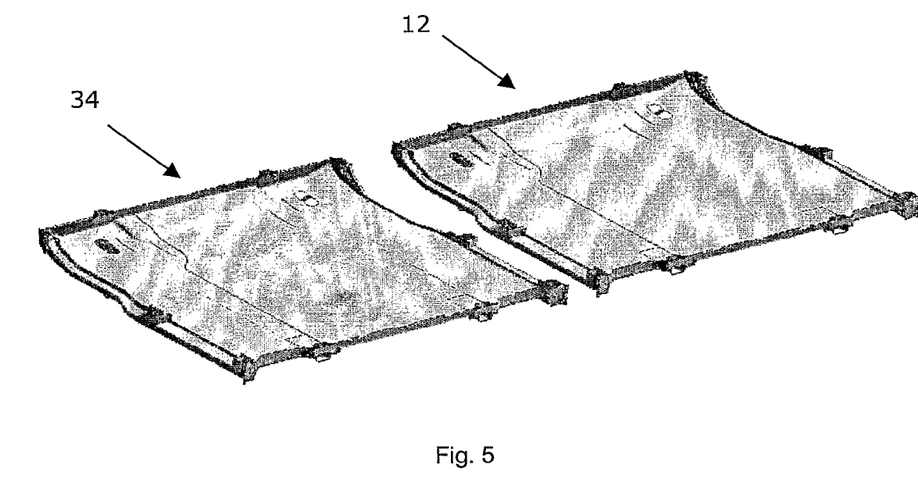
FIG. 5 shows an inventive panel and a known panel.

FIG. 5 shows a substantially rectangular panel 34 according to an embodiment of the invention which has been embossed with an optimal mode shape whose contours were determined using a substantially flat panel 12. The inventive and aesthetically pleasing embossed panel 34 will excite vibration in a specific mode with low acoustic radiation efficiency with respect to the input of vibrations in a predetermined frequency band that results in noise. The noisiest vibration modes of the embossed panel 34 are for example located at frequencies at which engine excitation is passed through quickly during startup. It should be noted that the inventive panel can be of any regular or irregular shape and that reinforcement means will not be necessary since the rigidity of the panel 34 is increased by the embossment pattern.

Figure 6:
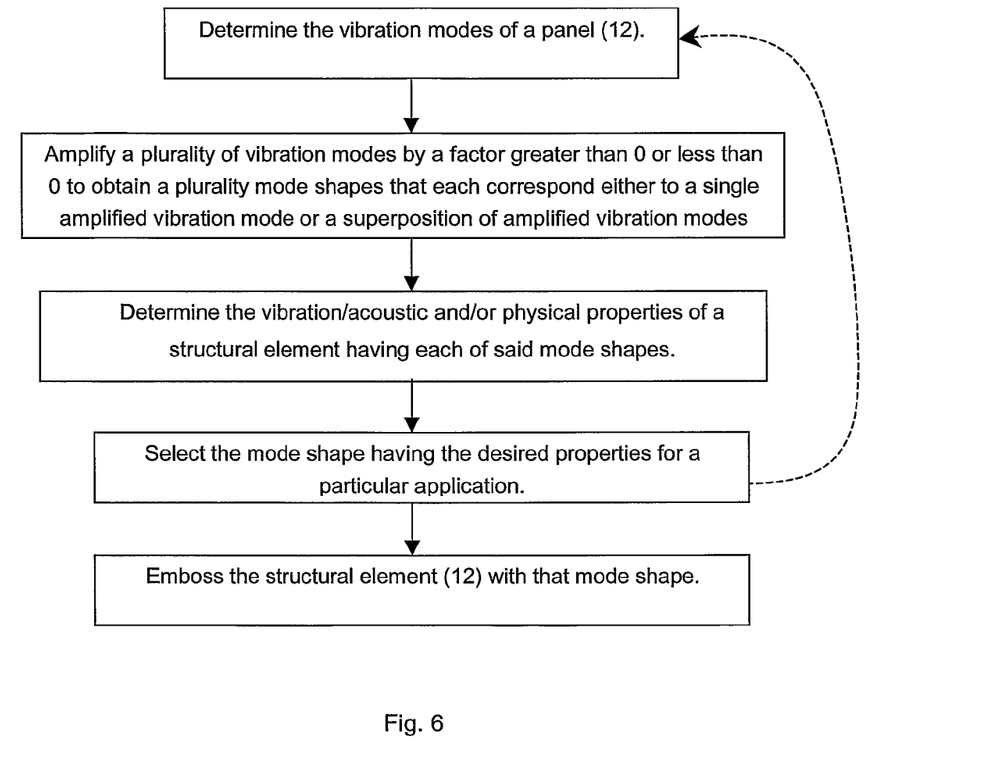
FIG. 6 is a flow diagram showing the steps of a method according to an embodiment of the invention.

FIG. 6 is a flow chart showing the steps of a method according to an embodiment of the invention. The method comprises the steps of determining one or more vibration modes of a structural element and amplifying the, or each vibration mode by a factor greater than zero or less than zero but not equal to zero to obtain a mode shape that corresponds to a single amplified vibration mode or a superposition of amplified vibration modes. The vibration/acoustic and/or physical properties of a structural element having each of said mode shapes is then determined and the mode shape having the desired properties for a particular application are selected and the structural element is embossed with that mode shape. The steps of the method can be applied iteratively in finite steps until a desired objective has been reached, as shown by the dashed arrow in FIG. 6.

EXAMPLE

Some calculations were made on a 1 m² simply supported steel panel (1005×1005×0.8 mm) using FEM. The absolute values of the first 9 vibration modes of the steel panel were embossed onto nine panels of the same dimensions, i.e., a different mode was embossed on each panel, using three different amplification factors and the modes of each embossed steel panel were studied. The results showed that mode no. 4 provided the panel having the greatest rigidity. The embossed panel having a mode shape corresponding to mode 4 had a first mode at 121, 159 and 194 Hz for maximum embossing depths of 30, 40 and 50 mm respectively. The first mode of the non-embossed, flat 1 m² steel panel appeared at a frequency of 3.8 Hz. So using an amplification factor that resulted in a maximum embossing depth of 40 mm increased the frequency of the first mode by a factor of about 42 after the flat panel had been embossed.

The invention claimed is:

1. Structural element embossed with a mode shape ($\phi_{total}$) corresponding to at least one of any number of stationary vibration modes ($\phi_n$) of which the structural element is capable.

2. Structural element according to claim 1, wherein the at least one vibration mode ($\phi hd n$) is amplified by a factor (C) greater than zero or less than zero before being embossed onto the structural element.

3. Structural element according to claim 1, wherein the at least one vibration mode ($\phi_n$) is a free vibration mode or forced vibration mode.

4. Structural element according to claim 1, wherein the mode shape ($\phi_{total}$) is defined by one of the following equations where the individual vibration modes are denoted by $\phi_n$, where n is the mode number; the amplitude factor for mode n is $C_n$, and the absolute value of each mode is denoted by the symbol | |:

$$\phi_{total} = C\phi_n$$

$$\phi_{total} = C|\phi_n|$$

$$\phi_{total} = C_1\phi_1 + C_2\phi_2 + \ldots C_n\phi_n$$

$$\phi_{total} = C_1|\phi_1| + C_2|\phi_2| + \ldots C_n|\phi_n|.$$

5. Vehicle comprising a structural element according to claim 1.

6. Vehicle according to claim 5, wherein the structural element constitutes at least part of the floor or body of the vehicle.

7. Method for designing a structural element, comprising:
determining at least one vibration mode ($\phi_n$) of a structural element; and
embossing the structural element with a mode shape ($\phi_{total}$) corresponding to the at least one vibration mode.

8. Method according to claim 7, comprising amplifying the at least one vibration mode by an amplitude factor (C) that is greater than zero, or less than zero to obtain a mode shape ($\phi_{total}$) that corresponds to a single amplified vibration mode ($\phi_n$) or a superposition of amplified vibration modes ($\phi_n$).

9. Method according to claim 7, comprising:
determining a plurality of mode shapes ($\phi_{total}$) for a structural element;
determining at least one of the vibration, acoustic, and physical properties of a structural element having each of the mode shapes ($\phi_{total}$);
selecting a mode shape ($\phi_{total}$) for an application; and
embossing the structural element with that mode shape ($\phi_{total}$).

10. Method according to claim 9, comprising at least one of selecting the mode shape ($\phi_{total}$) that has at least one vibration mode within a desired frequency range and selecting the mode shape ($\phi_{total}$) that has at least a local rigidity within a desired range of rigidity.

11. Method according to claim 7, c comprising determining a frequency at which there is a vibration-related problem in the structural element and selecting a mode shape ($\phi_{total}$) that reduces the vibration-problem at that frequency.

12. Method according, to a claim 7, c comprising determining a frequency at which a greatest amount noise is transmitted by the structural element and selecting a mode shape ($\phi_{total}$) that reduces noise transmission at that frequency.

13. Method according to claim 12, comprising selecting a mode shape ($\phi_{total}$) that reduces noise transmission within a frequency range of 25-35 Hz or 30-100 Hz.

14. Method according to claim 8, comprising determining the mode shape ($\phi_{total}$) of a structural element by one of iteratively increasing and decreasing the amplitude factor (C) in finite steps, one of increasing and decreasing the embossing depth in finite steps, determining at least one of vibration, acoustic, and physical properties of a structural element having each of the mode shapes ($\phi_{total}$) selecting the mode shape ($\phi_{total}$) having desired properties for a particular application and embossing the structural element with that mode shape ($\phi_{total}$).

15. Method according to claim 7, wherein the vibration modes ($\phi_n$) are at least one of calculated and measured by sensors.

16. Method according to claim 7, wherein the vibration modes ($\phi_n$) are at least one of free vibration modes and forced vibration modes.

17. Method according to claim 7, wherein the mode shape ($\phi_{total}$) is determined by using at least one of an absolute and an actual value of one or more vibration modes ($\phi_n$).

18. Method according to claim 7, wherein the mode shape ($\phi_{total}$) is defined by one of the following equations where the individual modes are denoted by $\phi_n$ where n is the mode number; the embossing amplitude for mode n is $C_n$, and the absolute value of each mode is denoted by the symbol | |:

$$\phi_{total} = C\phi_n$$

$$\phi_{total} = C|\phi_n|$$

$$\phi_{total} = C_1\phi_1 + C_2\phi_2 + \ldots C_n\phi_n$$

$$\phi_{total} = C_1|\phi_1| + C_2|\phi_2| + \ldots C_n|\phi_n|.$$

19. Method according to claim 7, comprising determining the vibration modes of the structural element on a structural element as mounted or supported in the particular application in which it will be utilized.

20. Method according to claim 7, comprising embossing the structural element with a plurality of vibration modes ($C.\phi_n$).

21. Computer program product comprising a computer program arranged to cause a computer or a processor to execute at least one of the steps of a method according to claim 7, the computer program product being stored on a non-transitory computer-readable medium.

22. Structural element according to claim 1 wherein the mode shape corresponds to a plurality of superposed vibration modes.

23. Method according to claim 7, wherein the mode shape corresponds to a plurality of superposed vibration modes.

* * * * *